(12) United States Patent
Mihara

(10) Patent No.: US 12,438,884 B2
(45) Date of Patent: Oct. 7, 2025

(54) INFORMATION MANAGEMENT DEVICE, METHOD FOR MANAGING INFORMATION, AND NON-TRANSITORY COMPUTER READABLE MEDIUM STORING INFORMATION MANAGEMENT PROGRAM

(71) Applicant: TOYOTA JIDOSHA KABUSHIKI KAISHA, Toyota (JP)

(72) Inventor: Dai Mihara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 99 days.

(21) Appl. No.: 18/417,516

(22) Filed: Jan. 19, 2024

(65) Prior Publication Data

US 2024/0275793 A1 Aug. 15, 2024

(30) Foreign Application Priority Data

Feb. 14, 2023 (JP) ................................. 2023-020759

(51) Int. Cl.
*H04L 9/40* (2022.01)
*G07C 5/00* (2006.01)

(52) U.S. Cl.
CPC ............ *H04L 63/107* (2013.01); *G07C 5/008* (2013.01)

(58) Field of Classification Search
None
See application file for complete search history.

(56) References Cited

U.S. PATENT DOCUMENTS

| 11,907,396 | B2* | 2/2024 | Sahib | G06F 21/6245 |
|---|---|---|---|---|
| 2014/0306834 | A1* | 10/2014 | Ricci | G06Q 50/40 |
| | | | | 340/902 |
| 2020/0051346 | A1* | 2/2020 | Zhang | H04W 12/02 |
| 2021/0049527 | A1* | 2/2021 | Beaumont | G06Q 50/265 |
| 2022/0382903 | A1* | 12/2022 | Herman | G06V 20/52 |
| 2023/0316445 | A1* | 10/2023 | Mesde | G06F 16/2365 |
| | | | | 705/325 |

FOREIGN PATENT DOCUMENTS

JP 2021-170016 A 10/2021

* cited by examiner

*Primary Examiner* — Paul R Fisher
(74) *Attorney, Agent, or Firm* — Dickinson Wright, PLLC

(57) ABSTRACT

An on-board ECU determines whether a list corresponding to a second jurisdiction has been stored in an information storage module before a vehicle starts traveling in the second jurisdiction. When the list corresponding to the second jurisdiction has not been stored in the information storage module, the on-board ECU obtains the list corresponding to the second jurisdiction before the vehicle starts traveling in the second jurisdiction. The on-board ECU inquires of a user as to whether the user will permit storage of one or more privacy information items included in the list corresponding to the second jurisdiction to the information storage module.

8 Claims, 5 Drawing Sheets

INFORMATION MANAGEMENT DEVICE, METHOD FOR MANAGING INFORMATION, AND NON-TRANSITORY COMPUTER READABLE MEDIUM STORING INFORMATION MANAGEMENT PROGRAM

BACKGROUND

1. Field

The following description relates to an information management device installed in a vehicle, a method for managing information, and a non-transitory computer readable medium storing an information management program.

2. Description of Related Art

Japanese Laid-Open Patent Publication No. 2021-170016 discloses an information management device that is installed in a vehicle. The information management device inquires of a user of the vehicle as to whether the user will permit storage of privacy information regarding the user in a persistent storage. The privacy information includes, for example, the name of the user, position information related to where the user is, and the speed of the vehicle.

When the user permits storage of the privacy information in the persistent storage, the information management device stores the privacy information in the persistent storage. When the user refuses storage of the privacy information in the persistent storage, the information management device uploads the privacy information of the user to a volatile memory. In such a case, the privacy information of the user is not stored in the persistent storage.

The privacy regulation that is in effect may differ from one jurisdiction to another jurisdiction. A jurisdiction is, for example, a country, a state, or a province.

When a user of a vehicle permits collection of his/her privacy information in a country where the privacy regulations are relatively lax and then the vehicle travels to a country where the privacy regulations are relatively strict, the privacy information may be collected in the country where the privacy regulations are relatively strict in the same manner as in the country where the privacy regulations are relatively lax.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information management device is installed in a vehicle. The information management device includes processing circuitry and a storage device. The processing circuitry is configured to store lists, each including one or more privacy information items that cannot be collected without permission from a user in the storage device. Each of the lists is specified for one of a plurality of jurisdictions including a first jurisdiction and a second jurisdiction. The processing circuitry is configured to determine whether one of the lists corresponding to the second jurisdiction has been stored in the storage device before the vehicle starts traveling in the second jurisdiction that differs from the first jurisdiction in which the vehicle is located. When the processing circuitry determines that the one of the lists corresponding to the second jurisdiction has not been stored in the storage device, the processing circuitry is configured to receive the one of the lists corresponding to the second jurisdiction from a data center before the vehicle starts traveling in the second jurisdiction. The processing circuitry is configured to inquire of the user as to whether the user will permit storage of the one or more privacy information items included in the one of the lists corresponding to the second jurisdiction to the storage device before the vehicle starts traveling in the second jurisdiction.

In another general aspect, a method for managing information is performed with an information management device installed in a vehicle. The information management device includes processing circuitry and a storage device. The processing circuitry is configured to store lists, each including one or more privacy information items that cannot be collected without permission from a user in the storage device. Each of the lists is specified for one of a plurality of jurisdictions including a first jurisdiction and a second jurisdiction. The method includes determining whether one of the lists corresponding to the second jurisdiction has been stored in the storage device with the processing circuitry before the vehicle starts traveling in the second jurisdiction that differs from the first jurisdiction in which the vehicle is located, receiving the one of the lists corresponding to the second jurisdiction from a data center with the processing circuitry before the vehicle starts traveling in the second jurisdiction when the processing circuitry determines that the one of the lists corresponding to the second jurisdiction has not been stored in the storage device, and issuing an inquiry to the user with the processing circuitry as to whether the user will permit storage of the one or more privacy information items included in the one of the lists corresponding to the second jurisdiction to the storage device before the vehicle starts traveling in the second jurisdiction.

In another general aspect, a non-transitory computer readable medium storing an information management program is provided. The information management program is executed by an information management device installed in a vehicle. The information management device includes processing circuitry and a storage device. The processing circuitry is configured to store lists each including one or more privacy information items that cannot be collected without permission from a user in the storage device. Each of the lists being specified for one of a plurality of jurisdictions including a first jurisdiction and a second jurisdiction. The processing circuitry running on the information management program is configured to determine whether one of the lists corresponding to the second jurisdiction has been stored in the storage device before the vehicle starts traveling in the second jurisdiction that differs from the first jurisdiction in which the vehicle is located. When the processing circuitry determines that the one of the lists corresponding to the second jurisdiction has not been stored in the storage device, the processing circuitry running on the information management program is configured to receive the one of the lists corresponding to the second jurisdiction from a data center before the vehicle starts traveling in the second jurisdiction. The processing circuitry running on the information management program is configured to inquire of the user as to whether the user will permit storage of the one or more privacy information items included in the one of the lists corresponding to the second jurisdiction to the storage device before the vehicle starts traveling in the second jurisdiction.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
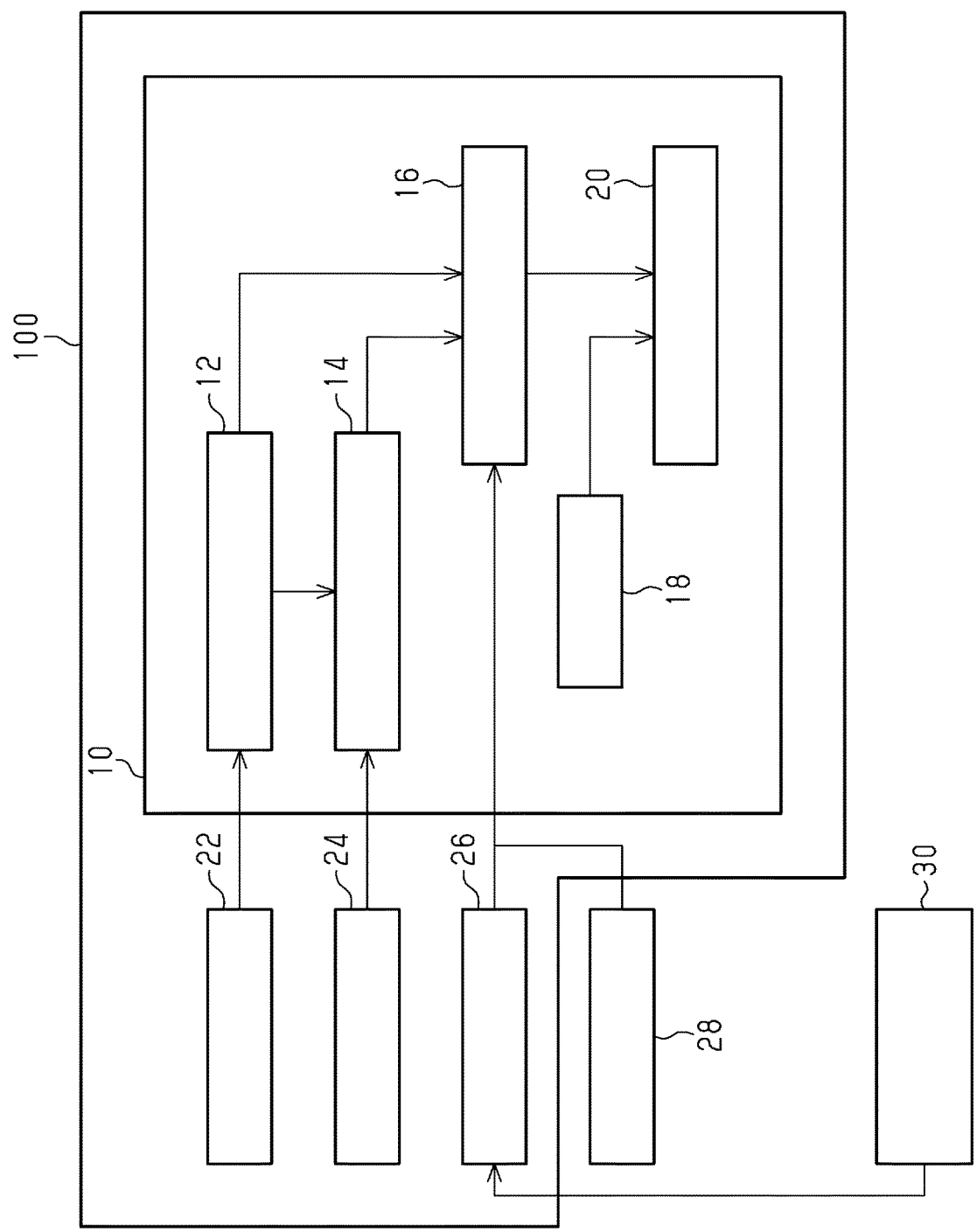
FIG. 1 is a schematic diagram of an information management device in accordance with an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An information management device in accordance with an embodiment will now be described with reference to the drawings.

Information Management Device 100

The schematic configuration of an information management device 100 installed in a vehicle will be described with reference to FIG. 1. A present jurisdiction determination module 12, which will be described later, repeatedly obtains position information of a vehicle from a Global Positioning System (GPS) sensor 22, which will be described later, from when an ignition key is turned to the on position to when the ignition key is turned to the off position. Lists of one or more privacy information items that can be collected only when permitted by a user is each specified for one of a plurality of jurisdictions. A storage permitted data determination module 16, which will be described later, is configured to store the list of the one or more privacy information items that cannot be collected without permission from the user to an information storage module 20 for each jurisdiction. The term "jurisdiction" refers to a regional range over which a certain regulation is effective. A jurisdiction is, for example, a country, a state, or a province. The privacy information includes, for example, information that does not change during a trip of the vehicle, such as the name of the user, the phone number of the user, the address of the user, and a facial image of the user. A trip refers to a period of time from when the ignition key is turned to the on position to when the ignition key is turned to the off position. The privacy information also includes, for example, information that continuously changes during a trip of the vehicle, such as the position information of the vehicle and the speed of the vehicle.

Before the vehicle starts traveling in a second jurisdiction that is adjacent to a first jurisdiction in which the vehicle is located, the storage permitted data determination module 16 determines whether a list corresponding to the second jurisdiction has already been stored in the information storage module 20. When it is determined that the list corresponding to the second jurisdiction has not been stored in the information storage module 20, the storage permitted data determination module 16 receives the list corresponding to the second jurisdiction from a data center 30 before the vehicle starts traveling in the second jurisdiction.

As described above, the storage permitted data determination module 16 receives a list corresponding to a jurisdiction that is adjacent to the present jurisdiction in which the vehicle is located from the data center 30. In this case, an on-board electronic control unit (ECU) 10 is able to establish communication with the data center 30. The information storage module 20 stores information indicating jurisdictions where the on-board ECU 10 cannot establish communication with the data center 30. Lists corresponding to such jurisdictions where communication cannot be established are stored in the information storage module 20 in advance.

The storage permitted data determination module 16 stores a privacy setting related to each jurisdiction in the information storage module 20. The privacy setting is not deleted even if the ignition key is turned to the off position. The privacy setting indicates whether the user has permitted storage of the privacy information items included in the list to the information storage module 20. The privacy setting is stored when the user responds to an inquiry issued to the user. The schedule for issuing an inquiry will be described later with reference to FIGS. 3 and 4.

Based on an affirmative privacy setting related to the jurisdiction in which the vehicle is located, the information storage module 20 stores the privacy information in accordance with the list corresponding to the jurisdiction. The affirmative privacy setting indicates that the user has permitted collection of the privacy information items included in the list. Based on a negative privacy setting related to the jurisdiction in which the vehicle is located, a restriction is imposed on storage of the privacy information in the information storage module 20 in accordance with the list corresponding to the jurisdiction. The negative privacy setting indicates that the user has refused collection of the privacy information items indicated in the list. For example, the following situations (A) to (C) may occur when a vehicle travels from a first jurisdiction to a second jurisdiction. (A) The privacy regulations in the first jurisdiction do not require permission from the user to store the position information of the vehicle in the information storage module 20. (B) The privacy regulations in the second jurisdiction require permission from the user to store the position information of the vehicle in the information storage module 20. (C) The privacy setting related to the second jurisdiction is negative. In such a case, the information storage module 20 stores the position information of the vehicle from when the vehicle enters the first jurisdiction to when the vehicle leaves the first jurisdiction. Storage of the position information of the vehicle in the information storage module 20 is restricted from when the vehicle enters the second jurisdiction to when the vehicle leaves the second jurisdiction. The position information of the vehicle from when the vehicle enters the first jurisdiction to when the vehicle leaves the first jurisdiction may be deleted after the vehicle enters the second jurisdiction. Alternatively, the position information may be kept stored even after the vehicle enters the second jurisdiction.

The information management device 100 includes the on-board ECU 10. The information management device 100 further includes the GPS sensor 22, a user interface 24, and a data communication module (DCM) 26. The on-board ECU 10 includes the present jurisdiction determination module 12, a user consent acquisition module 14, the storage permitted data determination module 16, and a control module 18. The on-board ECU 10 further includes the information storage module 20. The on-board ECU 10 is connected to an updating tool 28 and receives data from the updating tool 28. The on-board ECU 10 is configured to establish communication with the data center 30 via the DCM 26.

The present jurisdiction determination module 12 repeatedly obtains the position information of the vehicle from the GPS sensor 22. The present jurisdiction determination module 12 determines the present jurisdiction in which the vehicle is located from the position information of the vehicle. The present jurisdiction determination module 12 provides the storage permitted data determination module 16 with present jurisdiction information. The present jurisdiction information indicates the present jurisdiction in which the vehicle is located. When the distance from the vehicle to a border of a jurisdiction adjacent to the present jurisdiction in which the vehicle is located becomes less than or equal to a predetermined distance, the present jurisdiction determination module 12 provides the user consent acquisition module 14 with determination information. The determination information indicates that the distance from the vehicle to the border of the jurisdiction adjacent to the present jurisdiction in which the vehicle is located is less than or equal to the predetermined distance. The predetermined distance is, for example, 5 kilometers.

If the privacy setting related to the present jurisdiction in which the vehicle is located has not been stored at a time point at which the ignition key is turned to the on position, the user consent acquisition module 14 issues an inquiry. The inquiry is issued from the user interface 24. The inquiry refers to a process for issuing an inquiry to the user as to whether the user will permit storage of the privacy information items included in the list corresponding to the present jurisdiction in which the vehicle is located. The inquiry does not have to be issued if the privacy setting related to the present jurisdiction in which the vehicle is located has already been stored. A case in which the inquiry is issued at a time point at which the ignition key is turned to the on position means that the inquiry is issued before the vehicle starts traveling in the present jurisdiction in which the vehicle is located. In this case, the user may decide whether to consent to storage of all privacy information items included in the list. Alternatively, the user may select to consent to storage of some of the privacy information items included in the list.

The user consent acquisition module 14 issues an inquiry when the distance from the vehicle to a border of a jurisdiction adjacent to the present jurisdiction in which the vehicle is located becomes less than or equal to the predetermined distance. This means that the inquiry is issued before the vehicle starts traveling in the jurisdiction adjacent to the present jurisdiction in which the vehicle is located. The inquiry is issued from the user interface 24. The inquiry corresponds to a process for issuing an inquiry to the user as to whether the user will permit storage of the privacy information items included in the list corresponding to the jurisdiction adjacent to the present jurisdiction in which the vehicle is located. The inquiry does not have to be issued if the privacy setting related to the jurisdiction adjacent to the present jurisdiction in which the vehicle is located has already been stored. In this case, the user may decide whether to consent to storage of all privacy information items included in the list. Alternatively, the user may select to consent to storage of some of the privacy information items included in the list.

The storage permitted data determination module 16 stores the privacy information items included in the list corresponding to the present jurisdiction in which the vehicle is located in the information storage module 20. This process is executed only when an affirmative privacy setting has been provided for the present jurisdiction in which the vehicle is located.

The storage permitted data determination module 16 is configured to receive an update request for updating a list corresponding to one of the jurisdictions that are stored in the information storage module 20. When the storage permitted data determination module 16 receives an update request, the storage permitted data determination module 16 updates the list corresponding to the one of the jurisdictions in response to the update request. The storage permitted data determination module 16 may receive an update request from, for example, the DCM 26. In this case, an over-the-air (OTA) technology is used. Instead of or in addition to the OTA technology, the storage permitted data determination module 16 may receive an update request from the updating tool 28 connected to the on-board ECU 10.

The control module 18 obtains various types of control data and provides the information storage module 20 with the obtained control data.

Normal Mode and Restriction Mode

In the above description referring to FIG. 1, the on-board ECU 10 repeatedly obtains the position information of the vehicle from the GPS sensor 22. This describes a process executed in a normal mode. However, the on-board ECU 10 may not be able to obtain the position information of the vehicle from the GPS sensor 22. When the on-board ECU 10 is able to obtain the position information of the vehicle, the on-board ECU 10 is switched to the normal mode. When the on-board ECU 10 cannot obtain the position information of the vehicle, the on-board ECU 10 is switched to a restriction mode. In this manner, the on-board ECU 10 is switchable between the two control modes.

Figure 2:
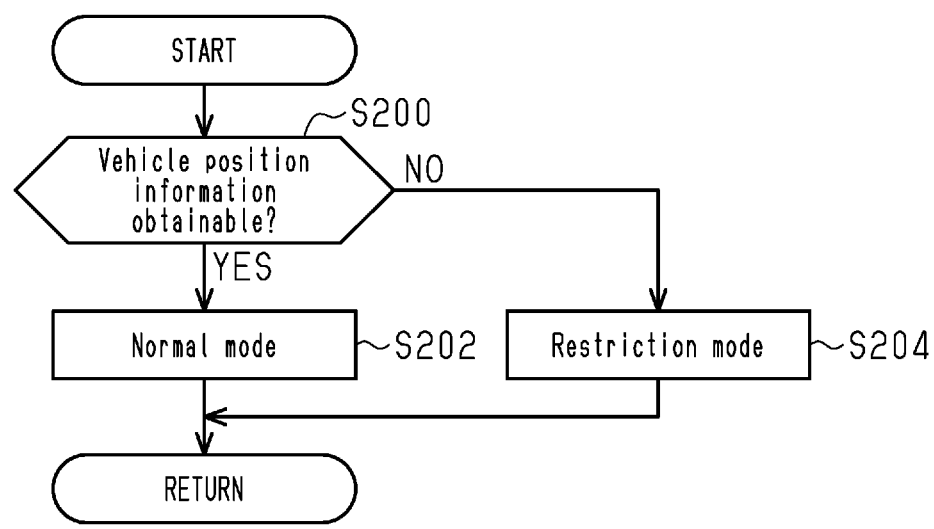
FIG. 2 is a flowchart illustrating a process for switching between a normal mode and a restriction mode based on whether the information management device shown in FIG. 1 can obtain position information of a vehicle.

As shown in FIG. 2, the on-board ECU 10 repeatedly determines whether the position information of the vehicle can be obtained while the ignition key is at the on position.

In step S200, the on-board ECU 10 determines whether the on-board ECU 10 can obtain the position information of the vehicle. When an affirmative determination is given in step S200 (step S200: YES), the on-board ECU 10 proceeds to step S202. In step S202, the on-board ECU 10 is switched to the normal mode. When a negative determination is given in step S200 (step S200: NO), the on-board ECU 10 proceeds to step S204. In step S204, the on-board ECU 10 is switched to the restriction mode.

In the restriction mode, when the on-board ECU 10 cannot obtain the position information of the vehicle, the on-board ECU 10 determines whether to store privacy information items included in a default list to the information storage module 20. The default list includes privacy information items that cannot be collected without permission from the user for all jurisdictions. In the restriction mode, the on-board ECU 10 issues an inquiry to the user as to whether the user will permit storage of the privacy information items included in the default list to the information storage module 20. If the privacy setting related to the default list has already been stored, the inquiry does not have to be issued.

Processing Flow in Normal Mode

Figure 3:
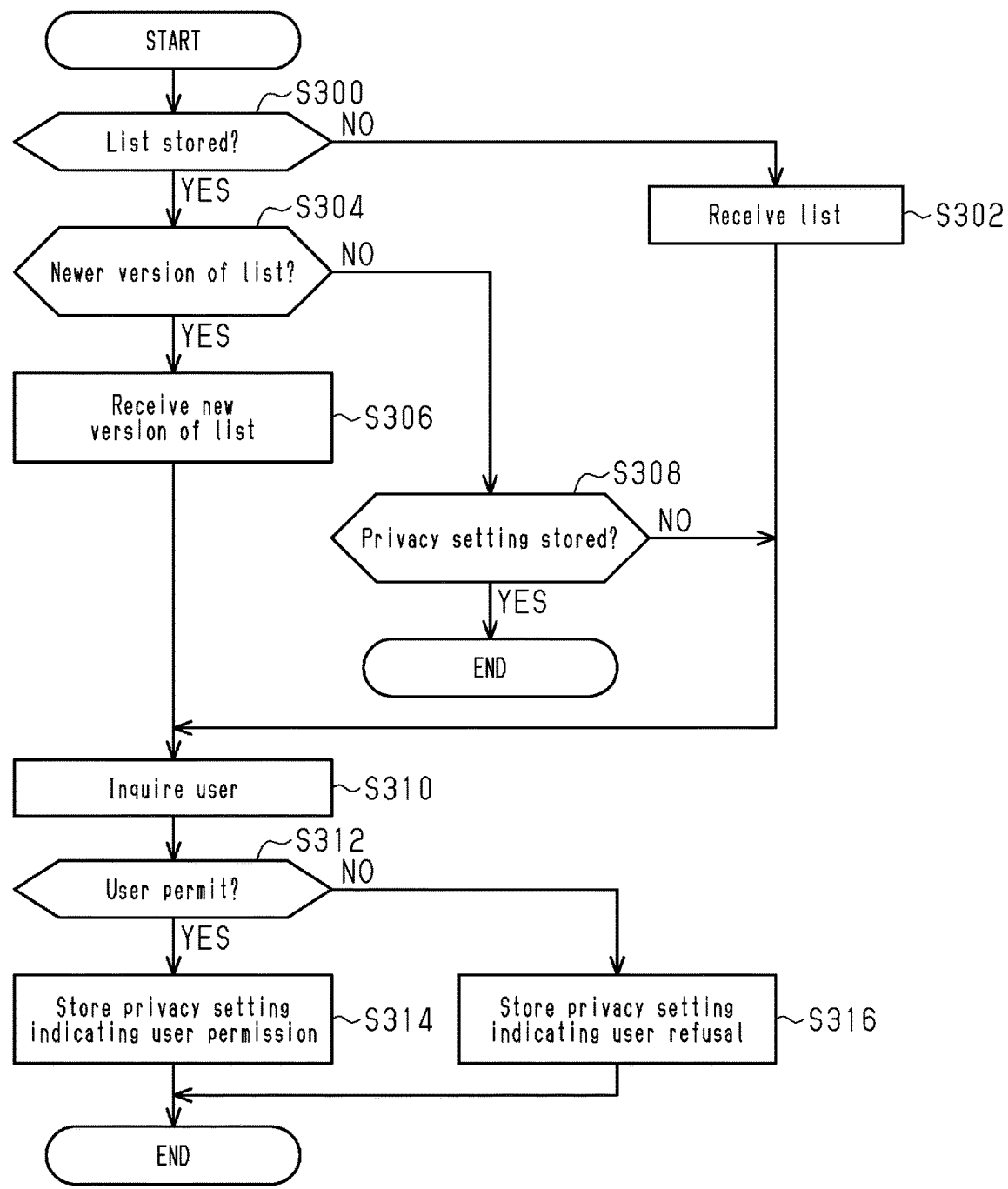
FIG. 3 is a flowchart illustrating a process for storing a privacy setting in a jurisdiction in which the vehicle is presently located.
Figure 4:
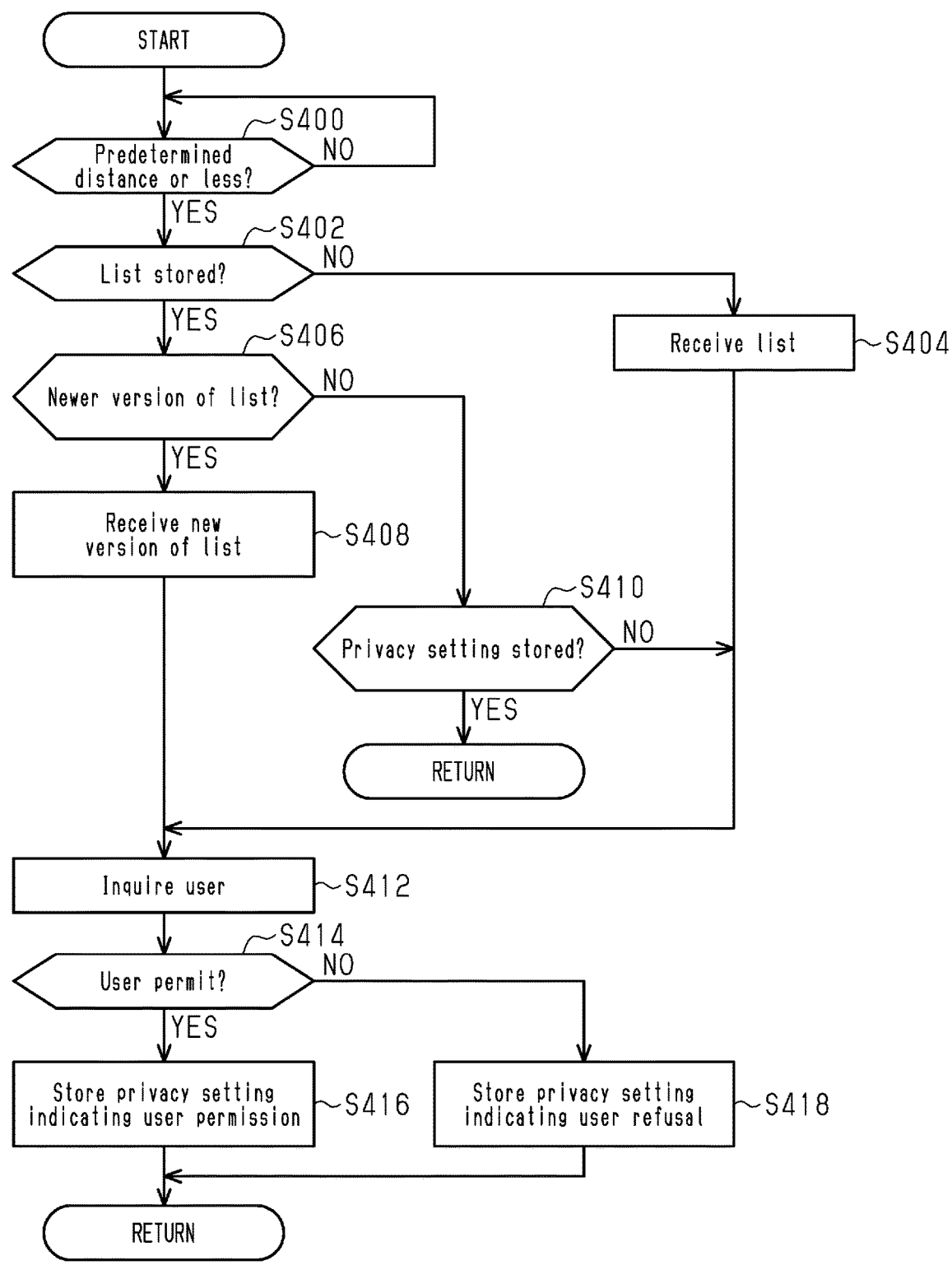
FIG. 4 is a flowchart illustrating a process for storing a privacy setting in a jurisdiction to which the vehicle may travel.

The flow of processes executed by the on-board ECU 10 in the normal mode will now be described in detail with reference to FIGS. 3 and 4. FIGS. 3 and 4 illustrate processes executed by the on-board ECU 10 that is able to perform communication with the data center 30 as described above. When the on-board ECU 10 cannot establish communication with the data center 30, the on-board ECU 10 will issue an inquiry asking whether the user will permit storage of the privacy information items included in the list stored in the information storage module 20. In this case, the information storage module 20 will store the privacy information related to the privacy information items. If the privacy setting related to the list has already been stored, the inquiry does not have to be issued.

FIG. 3 illustrates the flow of a process executed by the on-board ECU 10 on condition that the control mode is the normal mode when the ignition switch is turned on. The process illustrated in FIG. 3 is also executed when the control mode is switched from the restriction mode to the normal mode.

In step S300, the on-board ECU 10 determines whether the list corresponding to the present jurisdiction in which vehicle is located has been stored in the information storage module 20. The on-board ECU 10 searches the information stored in the information storage module 20 for the list corresponding to the present jurisdiction in which the vehicle is located. The on-board ECU 10 refers to the information stored in the information storage module 20 to determine whether the list has been stored in the information storage module 20.

When a negative determination is given in step S300 (S300: NO), the on-board ECU 10 proceeds to step S302. In step S302, the on-board ECU 10 establishes communication with the data center 30 and receives the list corresponding to the present jurisdiction in which the vehicle is located.

When an affirmative determination is given in step S300 (S300: YES), the on-board ECU 10 proceeds to step S304. In step S304, the on-board ECU 10 determines whether there is a newer version of the list, which is stored in the information storage module 20. For example, the on-board ECU 10 receives data indicating a version number of the list corresponding to the present jurisdiction in which the vehicle is located from the data center 30. The date when the list was updated may be used as the version number. The on-board ECU 10 compares the version number received from the data center 30 with the version number of the list stored in the information storage module 20. This allows the on-board ECU 10 to determine whether there is a newer version of the list.

When an affirmative determination is given in step S304 (S304: YES), the on-board ECU 10 proceeds to step S306. In step S306, the on-board ECU 10 receives the newer version of the list from the data center 30.

When a negative determination is given in step S304 (S304: NO), the on-board ECU 10 proceeds to step S308. In step S308, the on-board ECU 10 determines whether the privacy setting related to the present jurisdiction in which the vehicle is located has been stored. When an affirmative determination is given in step S308 (step S308: YES), the on-board ECU 10 ends the process shown in FIG. 3.

After step S302 or S306 or when a negative determination is given in step S308 (S308: NO), the on-board ECU 10 proceeds to step S310. In step S310, the on-board ECU 10 issues an inquiry to the user as to whether the user will permit storage of the privacy information items included in the list corresponding to the present jurisdiction in which the vehicle is located to the information storage module 20. Since the inquiry is issued at a time point at which the ignition key is turned to the on position, the inquiry is issued before the vehicle starts traveling in the present jurisdiction in which the vehicle is located. Then, the on-board ECU 10 proceeds to step S312.

In step S312, the on-board ECU 10 determines whether the user has permitted storage. When an affirmative determination is given in step S312 (step S312: YES), the on-board ECU 10 proceeds to step S314. In step S314, the on-board ECU 10 stores a privacy setting indicating that the user has permitted storage in the information storage module 20.

When a negative determination is given in step S312 (step S312: NO), the on-board ECU 10 proceeds to step S316. In step S316, the on-board ECU 10 stores a privacy setting indicating that the user has refused storage in the information storage module 20.

After the on-board ECU 10 executes step S314 or S316, the on-board ECU 10 ends the process shown in FIG. 3.

The process illustrated in FIG. 3 is an example of a case in which the vehicle travels from the first jurisdiction to the second jurisdiction, which is adjacent to the first jurisdiction, and then the ignition key is turned to the off position.

As a result of step S310, the on-board ECU 10 issues an inquiry to the user as to whether the user will permit storage of the privacy information items included in the list corresponding to the second jurisdiction in the information storage module 20 before the vehicle starts traveling in the second jurisdiction. As a result of steps S202 and S314, the on-board ECU 10 stores the privacy information items included in the list corresponding to the second jurisdiction to the information storage module 20 on condition that the vehicle is located in the second jurisdiction and the user has permitted storage.

As a result of step S308, the on-board ECU 10 does not issue an inquiry when the privacy setting related to the second jurisdiction has been stored in the information storage module 20.

FIG. 4 illustrates the flow of a process repeatedly executed by the on-board ECU 10 from when the ignition switch is turned on if the control mode is the normal mode. The process illustrated in FIG. 4 is also repeatedly executed once the control mode is switched from the restriction mode to the normal mode.

In step S400, the on-board ECU 10 determines whether the distance from the vehicle to a border of a jurisdiction adjacent to the present jurisdiction in which the vehicle is located is less than or equal to the predetermined distance.

When a negative determination is given in step S400 (step S400: NO), the on-board ECU 10 repeats step S400.

When an affirmative determination is given in step S400 (step S400: YES), the on-board ECU 10 proceeds to step S402.

In step S402, the on-board ECU 10 determines whether the list corresponding to the jurisdiction adjacent to the present jurisdiction in which the vehicle is located has been stored in the information storage module 20. The on-board ECU 10 searches the information stored in the information storage module 20 for the list corresponding to the one of the jurisdictions adjacent to the present jurisdiction in which the vehicle is located of which the border is within the predetermined distance from the vehicle. The on-board ECU 10 refers to the information stored in the information storage module 20 to determine whether the list has been stored in the information storage module 20.

When a negative determination is given in step S402 (S402: NO), the on-board ECU 10 proceeds to step S404. In step S404, the on-board ECU 10 establishes communication with the data center 30 and receives the list corresponding to the adjacent jurisdiction.

When an affirmative determination is given in step S402 (S402: YES), the on-board ECU 10 proceeds to step S406. In step S406, the on-board ECU 10 determines whether there is a newer version of the list, which is stored in the information storage module 20. For example, the on-board ECU 10 receives data indicating the version number of the list corresponding to the adjacent jurisdiction from the data center 30. The date when the list was updated may be used as the version number. The on-board ECU 10 compares the version number received from the data center 30 with the version number of the list stored in the information storage module 20. This allows the on-board ECU 10 to determine whether there is a newer version of the list.

When an affirmative determination is given in step S406 (S406: YES), the on-board ECU 10 proceeds to step S408. In step S408, the on-board ECU 10 receives the newer version of the list from the data center 30.

When a negative determination is given in step S406 (S406: NO), the on-board ECU 10 proceeds to step S410. In step S410, the on-board ECU 10 determines whether the privacy setting related to the adjacent jurisdiction has been stored. When an affirmative determination is given in step S410 (step S410: YES), the on-board ECU 10 ends the process shown in FIG. 4.

After the on-board ECU 10 executes step S404 or S408 or when the on-board ECU 10 gives a negative determination in step S410 (S410: NO), the on-board ECU 10 proceeds to step S412. In step S412, the on-board ECU 10 issues an inquiry to the user as to whether the user will permit storage of the privacy information items included in the list corresponding to the jurisdiction adjacent to the present jurisdiction in which the vehicle is located to the information storage module 20. As a result of steps S400 to S412, the on-board ECU 10 issues the inquiry at a point in time at which the distance from the vehicle to the border of the jurisdiction adjacent to the present jurisdiction in which the vehicle is located becomes less than or equal to the predetermined distance. In other words, the inquiry is issued before the vehicle starts traveling in the adjacent jurisdiction. Then, the on-board ECU 10 proceeds to step S414.

In step S414, the on-board ECU 10 determines whether the user has permitted storage of the privacy information. When an affirmative determination is given in step S414 (step S414: YES), the on-board ECU 10 proceeds to step S416. In step S416, the on-board ECU 10 stores a privacy setting indicating that the user has permitted storage in the information storage module 20.

When a negative determination is given in step S414 (step S414: NO), the on-board ECU 10 proceeds to step S418. In step S418, the on-board ECU 10 stores a privacy setting indicating that the user has refused storage in the information storage module 20.

After the on-board ECU 10 executes step S416 or step S418, the on-board ECU 10 ends the process shown in FIG. 4.

The process illustrated in FIG. 4 shows an example of a case in which the vehicle travels from the first jurisdiction to the second jurisdiction, which is adjacent to the first jurisdiction.

As a result of steps S400 and S402, the on-board ECU 10 determines whether the list corresponding to the second jurisdiction has been stored in the information storage module 20 before the vehicle starts traveling in the second jurisdiction that is adjacent to the first jurisdiction in which the vehicle is located.

As a result of steps S402 and S404, when the on-board ECU 10 determines that the list corresponding to the second jurisdiction has not been stored in the information storage module 20, the on-board ECU 10 receives the list corresponding to the second jurisdiction from the data center 30 before the vehicle starts traveling in the second jurisdiction.

As a result of steps S402 and S406, when the on-board ECU 10 determines that the list corresponding to the second jurisdiction has been stored in the information storage module 20, the on-board ECU 10 determines whether there is a newer version of the list, which corresponds to the second jurisdiction stored in the information storage module 20. As a result of steps S406 and S408, when there is a newer version of the list, which corresponds to the second jurisdiction stored in the information storage module 20, the on-board ECU 10 receives the newer version of the list, which corresponds to the second jurisdiction, from the data center 30 and updates the list, which corresponds to the second jurisdiction stored in the information storage module 20, with the newer version.

As a result of steps S400 to S412, the on-board ECU 10 issues an inquiry when the vehicle is located in the first jurisdiction and the distance from the vehicle to the border of the second jurisdiction becomes less than or equal to the predetermined distance.

As a result of steps S400 and S412, the on-board ECU 10 issues an inquiry to the user as to whether the user will permit storage of the privacy information items included in the list corresponding to the second jurisdiction to the information storage module 20 before the vehicle starts traveling in the second jurisdiction. As a result of steps S202 and S416, the on-board ECU 10 stores the privacy information items included in the list corresponding to the second jurisdiction to the information storage module 20 on condition that the vehicle is located in the second jurisdiction and the user has permitted storage in the information storage module 20.

As a result of step S410, the on-board ECU 10 does not issue an inquiry when the privacy setting related to the second jurisdiction has been stored in the information storage module 20.

List Deletion

A process for deleting a list will now be described with reference to FIG. 5. The process is executed after the vehicle travels from the first jurisdiction to the second jurisdiction that is adjacent to the first jurisdiction. In certain cases, the on-board ECU 10 will be able to obtain the list corresponding to the first jurisdiction from the data center 30 when the vehicle is within the predetermined distance from the border of the first jurisdiction. In other cases, the on-board ECU 10 will not be able to obtain the list corresponding to the first jurisdiction from the data center 30 when the vehicle is within the predetermined distance from the border of the first jurisdiction.

The list corresponding to the first jurisdiction remains stored in the information storage module 20 immediately after the vehicle leaves the first jurisdiction. In step S500, the on-board ECU 10 determines whether the distance from the vehicle to the border between the first jurisdiction and the second jurisdiction is greater than or equal to a specified distance. The specified distance is greater than the predetermined distance. When an affirmative determination is given in step S500 (S500: YES), the on-board ECU 10 proceeds to step S502.

In step S502, the on-board ECU 10 determines whether the list corresponding to the first jurisdiction can be obtained from the data center 30 when the vehicle is within the predetermined distance from the border of the first jurisdiction. As described above, the information storage module 20 stores the information indicating that the on-board ECU 10 cannot establish communication with the data center 30 in certain jurisdictions. More specifically, in step S502, the on-board ECU 10 determines whether information indicating that the on-board ECU 10 cannot establish communication with the data center 30 in relation with the first jurisdiction is stored in the information storage module 20. When information indicating that the on-board ECU 10 cannot establish communication with the data center 30 in relation with the first jurisdiction is not stored in the information storage module 20, the on-board ECU 10 gives an affirmative determination in step S502. When information indicating that the on-board ECU 10 cannot establish communication with the data center 30 in relation with the first jurisdiction is stored in the information storage module 20, the on-board ECU 10 gives a negative determination in step S502. When an affirmative determination is given in step S502, the on-board ECU 10 proceeds to step S504.

In step S504, the on-board ECU 10 permits deletion of the list corresponding to the first jurisdiction stored in the information storage module 20. For example, the list corresponding to the first jurisdiction may be completely deleted in step S504. Alternatively, a region in the information storage module 20 where the list corresponding to the first jurisdiction is stored may be overwritten with other data. Further, the privacy setting related to the first jurisdiction may be deleted.

As a result of steps S500 to S504, the on-board ECU 10 permits deletion of the list corresponding to the first jurisdiction when the vehicle travels from the first jurisdiction to the second jurisdiction if the vehicle is located outside the first jurisdiction and the distance from the vehicle to the border between the first jurisdiction and the second jurisdiction is greater than or equal to the specified distance, which is greater than the predetermined distance.

Advantages of the Present Embodiment (1) In a comparative example, the information storage module 20 stores a list of one or more privacy information items that cannot be collected without permission from the user for all jurisdictions. In the present embodiment, when a list corresponding to a jurisdiction that is adjacent to the present jurisdiction in which the vehicle is located has not been stored in the information storage module 20, the on-board ECU 10 receives the list from the data center 30. That is, the on-board ECU 10 obtains the list corresponding to the position of the vehicle. Thus, the information storage module 20 will have more free space than the comparative example. The on-board ECU 10 uses the obtained list to check the intention of the user as to whether the user will permit collection of the corresponding privacy information. The list prepared for each jurisdiction allows the intention of the user as to whether the user will permit collection of the privacy information to be appropriately reflected even when the vehicle travels from the first jurisdiction to the second jurisdiction.

(2) When the on-board ECU 10 determines that a list corresponding to the second jurisdiction has been stored in the information storage module 20, the on-board ECU 10 is configured to determine whether there is a newer version of the list, which corresponds to the second jurisdiction stored in the information storage module 20. Further, when there is a newer version of the list, which corresponds to the second jurisdiction stored in the information storage module 20, the on-board ECU 10 is configured to receive the newer version of the list, which corresponds to the second jurisdiction, from the data center 30 and update the list, which corresponds to the second jurisdiction stored in the information storage module 20, with the newer version.

When there is a newer version of the list, which is stored in the information storage module 20, the on-board ECU 10 receives the newer version from the data center 30. The newer version of the list allows for appropriate protection of the privacy information.

(3) The on-board ECU 10 is configured to receive the list corresponding to the second jurisdiction from the data center 30 when the distance from the vehicle to the border between the first jurisdiction and the second jurisdiction becomes less than or equal to the predetermined distance.

In the present embodiment, the on-board ECU 10 receives the list corresponding to the second jurisdiction from the data center 30 when the possibility of the vehicle traveling to the second jurisdiction becomes high. This avoids a situation in which the on-board ECU 10 receives the list corresponding to the second jurisdiction even though the possibility that the vehicle travels to the second jurisdiction is low. Thus, unnecessary processes will not be executed.

(4) The on-board ECU 10 is configured to be able to delete the list corresponding to the first jurisdiction when the vehicle travels from the first jurisdiction to the second jurisdiction if the vehicle is located outside the first jurisdiction and the distance from the vehicle to the border between the first jurisdiction and the second jurisdiction is greater than or equal to the specified distance that is greater than the predetermined distance.

This increases the free space on the information storage module 20.

MODIFIED EXAMPLES

The present embodiment may be modified as follows. The present embodiment and the following modifications can be combined as long as the combined modifications remain technically consistent with each other.

In the above embodiment, the information storage module 20 stores the information indicating that the on-board ECU 10 cannot establish communication with the data center 30 in certain jurisdictions. The lists corresponding to such jurisdictions are stored in the information storage module 20 in advance. However, this is merely an example. For example, a default list may be used when the on-board ECU 10 cannot establish communication with the data center 30.

The on-board ECU 10 may be configured to determine a route to a destination of the vehicle based on information indicating the destination that is set by the user. On condition that the route at least partially includes the second jurisdiction, the on-board ECU 10 may be configured to receive the list corresponding to the second jurisdiction from the data center 30 and inquire of the user as to whether the user will permit storage of the privacy information items included in the list corresponding to the second jurisdiction to the information storage module 20. The above-described configuration avoids a situation in which the on-board ECU 10 obtains the list corresponding to the second jurisdiction although the vehicle will not travel in the second jurisdiction. Further, the on-board ECU 10 will not issue an unnecessary inquiry to the user using the list corresponding to the second jurisdiction.

The on-board ECU 10 may be configured to determine a route to a destination of the vehicle based on information indicating the destination that is set by the user. If the route indicates that vehicle will travel from the first jurisdiction to the second jurisdiction and then return to the first jurisdiction, the on-board ECU 10 may be configured to not delete the list corresponding to the first jurisdiction even when the vehicle is located outside the first jurisdiction and the distance from the vehicle to the border between the first jurisdiction and the second jurisdiction is greater than or equal to the specified distance. This avoids a situation in which the list corresponding to the first jurisdiction is deleted even though the vehicle will return to the first jurisdiction after leaving the first jurisdiction.

In the above embodiment, a jurisdiction is, for example, a country, a state, or a province. However, there is no limitation to a jurisdiction. For example, if the same privacy regulations are effective in neighboring countries, these countries may be considered as one jurisdiction.

In the above embodiment, the on-board ECU 10 issues an inquiry when the distance from the vehicle to the border of the jurisdiction adjacent to the present jurisdiction in which the vehicle is located becomes less than or equal to the predetermined distance. However, this is merely an example. For example, the adjacent jurisdiction may be surrounded by a geofence. In such a case, the on-board ECU 10 issues an inquiry when the vehicle passes the geofence.

In the above embodiment, the on-board ECU 10 issues an inquiry when the distance from the vehicle to the border of the jurisdiction adjacent to the present jurisdiction in which the vehicle is located becomes less than or equal to the predetermined distance. However, this is merely an example. The on-board ECU 10 may issue an inquiry when the distance from the vehicle to the border of jurisdictions differing from the present jurisdiction in which the vehicle is located becomes less than or equal to the predetermined distance. In other words, there may be a different jurisdiction between the present jurisdiction in which the vehicle is located and the jurisdiction related to the inquiry.

In the above embodiment, the privacy setting is not deleted even when the ignition key is turned to the off position. Alternatively, the privacy setting may be deleted when the ignition key is turned to the off position.

Figure 5:
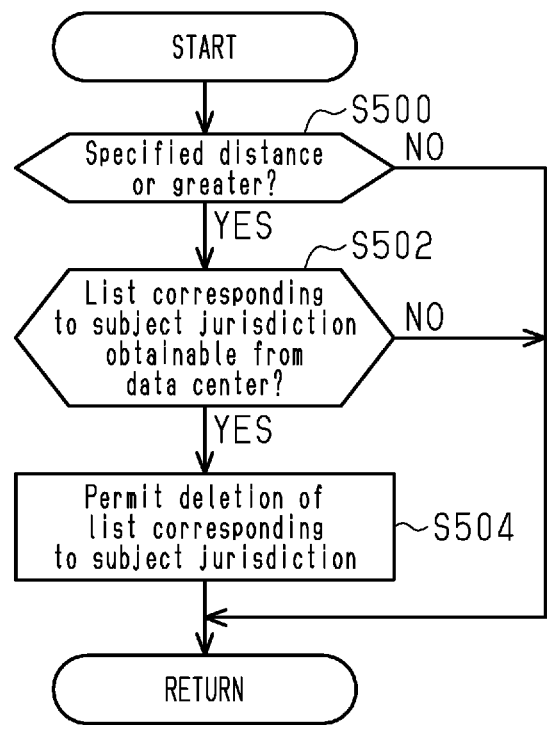
FIG. 5 is a flowchart illustrating a process for permitting deletion of a list corresponding to a jurisdiction.

Step S502 shown in FIG. 5 may be omitted.

The entire process illustrated in FIG. 5 may be omitted.

In the above embodiment, the information management device 100 includes the on-board ECU 10 containing multiple modules 12 to 18 and the information storage module 20. The on-board ECU 10 executes software processing. However, this is merely an example. For example, some of the modules 12 to 18 may be part of a single module. Further, for example, the on-board ECU 10 may include a dedicated hardware circuit (e.g., application specific integrated circuit (ASIC)) that executes at least part of the software processing performed in the above embodiment. Specifically, the on-board ECU 10 may be modified as long as it has any one of the following configurations (a) to (c). (a) The on-board ECU 10 includes a processor that executes all processes according to a program and a program storage device such as a ROM that stores the program. In other words, the on-board ECU 10 includes a software execution device. (b) The on-board ECU 10 includes a processor that executes part of processes according to a program and a program storage. The on-board ECU 10 further includes a dedicated hardware circuit that executes the remaining processes. (c) The on-board ECU 10 includes a dedicated hardware circuit that executes all processes. There may be more than one software execution device and/or more than one dedicated hardware circuit. Specifically, the above-described processes may be executed by processing circuitry including at least one of a software execution device and a dedicated hardware circuit. The processing circuitry may include more than one software execution device and more than one dedicated hardware circuit. The program storage device, or computer readable medium, includes any type of storage device that is a medium accessible by a versatile computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An information management device installed in a vehicle, the information management device comprising:
   processing circuitry; and
   a storage device, wherein:
   the processing circuitry is configured to store lists, each including one or more privacy information items that cannot be collected without permission from a user in the storage device, each of the lists being specified for one of a plurality of jurisdictions including a first jurisdiction and a second jurisdiction;
   the processing circuitry is configured to determine whether one of the lists corresponding to the second jurisdiction has been stored in the storage device before the vehicle starts traveling in the second jurisdiction that differs from the first jurisdiction in which the vehicle is located;
   when the processing circuitry determines that the one of the lists corresponding to the second jurisdiction has not been stored in the storage device, the processing circuitry is configured to receive the one of the lists corresponding to the second jurisdiction from a data center before the vehicle starts traveling in the second jurisdiction; and the processing circuitry is configured to inquire of the user as to whether the user will permit storage of the one or more privacy information items included in the one of the lists corresponding to the second jurisdiction to the storage device before the vehicle starts traveling in the second jurisdiction.

2. The information management device according to claim 1, wherein:

when the processing circuitry determines that the one of the lists corresponding to the second jurisdiction has been stored in the storage device, the processing circuitry is configured to determine whether there is a newer version of the one of the lists, which corresponds to the second jurisdiction stored in the storage device; and when there is a newer version of the one of the lists, which corresponds to the second jurisdiction stored in the storage device, the processing circuitry is configured to receive the newer version of the one of the lists, which corresponds to the second jurisdiction, from the data center and update the one of the lists, which corresponds to the second jurisdiction stored in the storage device, with the newer version.

3. The information management device according to claim 1, wherein the processing circuitry is configured to receive the one of the lists corresponding to the second jurisdiction from the data center when a distance from the vehicle to a border of the first jurisdiction and the second jurisdiction becomes less than or equal to a predetermined distance.

4. The information management device according to claim 3, wherein the processing circuitry is configured to be able to delete a further one of the lists corresponding to the first jurisdiction when the vehicle travels from the first jurisdiction to the second jurisdiction if the vehicle is located outside the first jurisdiction and the distance from the vehicle to the border of the first jurisdiction and the second jurisdiction is greater than or equal to a specified distance that is greater than the predetermined distance.

5. The information management device according to claim 1, wherein:

the processing circuitry is configured to determine a route to a destination of the vehicle based on information indicating the destination that is set by the user; and on condition that the route at least partially includes the second jurisdiction, the processing circuitry receives the one of the lists corresponding to the second jurisdiction from the data center and inquires of the user as to whether the user will permit storage of the one or more privacy information items included in the one of the lists corresponding to the second jurisdiction to the storage device.

6. The information management device according to claim 4, wherein the processing circuitry is configured to determine a route to a destination of the vehicle based on information indicating the destination that is set by the user; and if the route indicates that the vehicle will travel from the first jurisdiction to the second jurisdiction and then return to the first jurisdiction, the processing circuitry is configured to not delete the further one of the lists corresponding to the first jurisdiction even when the vehicle is located outside the first jurisdiction and the distance from the vehicle to the border of the first jurisdiction and the second jurisdiction is greater than or equal to the specified distance.

7. A method for managing information with an information management device installed in a vehicle, wherein the information management device includes processing circuitry and a storage device; the processing circuitry is configured to store lists, each including one or more privacy information items that cannot be collected without permission from a user in the storage device; and each of the lists is specified for one of a plurality of jurisdictions including a first jurisdiction and a second jurisdiction, the method comprising:

determining whether one of the lists corresponding to the second jurisdiction has been stored in the storage device with the processing circuitry before the vehicle starts traveling in the second jurisdiction that differs from the first jurisdiction in which the vehicle is located;

receiving the one of the lists corresponding to the second jurisdiction from a data center with the processing circuitry before the vehicle starts traveling in the second jurisdiction when the processing circuitry determines that the one of the lists corresponding to the second jurisdiction has not been stored in the storage device; and issuing an inquiry to the user with the processing circuitry as to whether the user will permit storage of the one or more privacy information items included in the one of the lists corresponding to the second jurisdiction to the storage device before the vehicle starts traveling in the second jurisdiction.

8. A non-transitory computer readable medium storing an information management program executed by an information management device installed in a vehicle, the information management device including processing circuitry and a storage device, the processing circuitry being configured to store lists each including one or more privacy information items that cannot be collected without permission from a user in the storage device, each of the lists being specified for one of a plurality of jurisdictions including a first jurisdiction and a second jurisdiction, wherein:

the processing circuitry running on the information management program is configured to determine whether one of the lists corresponding to the second jurisdiction has been stored in the storage device before the vehicle starts traveling in the second jurisdiction that differs from the first jurisdiction in which the vehicle is located;

when the processing circuitry determines that the one of the lists corresponding to the second jurisdiction has not been stored in the storage device, the processing circuitry running on the information management program is configured to receive the one of the lists corresponding to the second jurisdiction from a data center before the vehicle starts traveling in the second jurisdiction; and the processing circuitry running on the information management program is configured to inquire of the user as to whether the user will permit storage of the one or more privacy information items included in the one of the lists corresponding to the second jurisdiction to the storage device before the vehicle starts traveling in the second jurisdiction.

* * * * *